US007856722B2

(12) United States Patent
Lago-Arenas

(10) Patent No.: US 7,856,722 B2
(45) Date of Patent: Dec. 28, 2010

(54) CUTLERY SET ASSEMBLY

(75) Inventor: Marta Lago-Arenas, c/o Royal College of Art, Kensington Gore, London SW7 2EU (GB)

(73) Assignees: Royal College of Art, London (GB); Marta Lago-Arenas, London (GB)

( * ) Notice: Subject to any disclaimer, the term of this patent is extended or adjusted under 35 U.S.C. 154(b) by 219 days.

(21) Appl. No.: 10/573,414

(22) PCT Filed: Sep. 27, 2004

(86) PCT No.: PCT/GB2004/004127

§ 371 (c)(1), (2), (4) Date: Nov. 2, 2006

(87) PCT Pub. No.: WO2005/030016

PCT Pub. Date: Apr. 7, 2005

(65) Prior Publication Data

US 2007/0079513 A1 Apr. 12, 2007

(30) Foreign Application Priority Data

Sep. 26, 2003 (GB) ................................ 0322610.7

(51) Int. Cl.
*A47G 21/06* (2006.01)
*A47J 43/28* (2006.01)

(52) U.S. Cl. ............................ 30/147; 30/142; D7/645

(58) Field of Classification Search .................. 30/142, 30/143, 147–150, 322–328, 340; D7/649–652, D7/642–645; 7/158; 15/245.1; 206/553
See application file for complete search history.

(56) References Cited

U.S. PATENT DOCUMENTS

| | | | | |
|---|---|---|---|---|
| 32,916 | A | 7/1861 | Richards | |
| 33,703 | A | 11/1861 | Hardie | |
| 34,098 | A | 1/1862 | Hardie et al. | |
| 1,030,756 | A * | 6/1912 | Yakligian | 30/143 |
| 1,053,387 | A | 2/1913 | Hawley | |
| 2,439,882 | A | 4/1948 | Beddow | |
| 2,470,492 | A | 5/1949 | Jenkins | |
| 2,601,402 | A * | 6/1952 | Krause et al. | 30/320 |
| 3,389,412 | A | 6/1968 | Emmons | |
| 4,317,284 | A | 3/1982 | Prindle | |
| 4,332,409 | A | 6/1982 | Stachowicz | |
| 4,377,035 | A | 3/1983 | Dalichow | |

(Continued)

FOREIGN PATENT DOCUMENTS

DE 23 44 806 * 3/1975

(Continued)

*Primary Examiner*—Clark F. Dexter
(74) *Attorney, Agent, or Firm*—Finnegan, Henderson, Farabow, Garrett, & Dunner, L.L.P.

(57) ABSTRACT

A cutlery set assembly is disclosed and comprises a knife (50) and a spoon (10) and/or a fork (30). The items of cutlery are made of resilient plastics material and each item of cutlery has a cylindrical handle. The handles are shaped such that they can be nested coaxially with each other. When in such a nested condition, the handle of the outermost item extends more than half way around the handle of the second item to hold the items in the nested condition. The resilience of the plastics material keeps the assembly together.

23 Claims, 7 Drawing Sheets

U.S. PATENT DOCUMENTS

| | | | | |
|---|---|---|---|---|
| 4,524,512 | A | 6/1985 | Formo et al. | |
| D284,442 | S | 7/1986 | Chan | |
| 4,914,819 | A * | 4/1990 | Ash | 30/147 |
| 4,995,154 | A | 2/1991 | Bamber | |
| D318,600 | S | 7/1991 | Lillelund et al. | |
| D347,972 | S | 6/1994 | Gaudet | |
| 5,327,650 | A | 7/1994 | Rojas | |
| D362,160 | S | 9/1995 | Brabeck et al. | |
| 5,655,663 | A * | 8/1997 | Spradlin | 209/172.5 |
| 5,845,403 | A | 12/1998 | Nivin | |
| 5,904,250 | A * | 5/1999 | De Schutter | 206/553 |
| 5,931,307 | A * | 8/1999 | Spradlin | 209/172.5 |
| 6,884,240 | B1 * | 4/2005 | Dykes | 606/1 |

FOREIGN PATENT DOCUMENTS

| | | |
|---|---|---|
| RU | 2 041 698 | 8/1995 |

* cited by examiner

CUTLERY SET ASSEMBLY

TECHNICAL FIELD

The present invention relates to a cutlery set assembly comprising a knife and one or more of a spoon and fork that can be assembled in a nested arrangement as a single unit. In particular, the present invention relates to a cutlery set assembly which when disassembled provides cutlery which are easy to handle, are lightweight and strong.

BACKGROUND ART

Lightweight, plastic disposable cutlery is commonly used, for example, in chain restaurants and by airlines when serving meals. The cutlery is of a conventional shape corresponding to the shape of metal cutlery and is not particularly strong. The spoon, fork and especially the knife (known generically as eating utensils) may bend in use and can be quite disconcerting for the user and difficult to manage. In fact, these utensils are generally ineffective when used with anything other than soft food.

Cutlery set assemblies for camping comprising a spoon, fork and knife are also known. Generally, the spoon, fork and knife are of a conventional shape and are attached together by a tongue and groove arrangement. Due to the demands required of the utensils when camping, the cutlery set is usually made from metal, such as aluminium, to provide strength and rigidity to the utensils which would be lacking in a plastic equivalent. As such, the cutlery set assembly used for camping is invariably more costly and is too expensive simply to be disposed of after use. The tongue and groove arrangement is also not a secure way of assembling the cutlery as a unit and may result in the loss of a utensil in which case a new set must be bought. The tongue and groove arrangement also makes that utensil having the tongue portions awkward to grip.

RU 2041698 describes a stainless steel spoon and fork assembly in which a section of the fork handle is tubular and hollow and provided with a longitudinal slot. The spoon has a solid tubular handle section whose outside diameter is equal to the inside diameter of the tubular section of the fork handle. The spoon handle may be slotted inside the fork handle to form a single implement having a fork at one end and a spoon at the other.

U.S. Pat. No. 5,327,650 describes a knife, fork and spoon assembly in which the knife has a handle with a recess on each of two opposed faces of the handle; the flat handles of the spoon and fork can be held within these recesses.

U.S. Pat. No. 33,703 describes a knife, fork and spoon assembly in which the knife and fork have interlocking hollow handles and the flat handle of the spoon can be nested in the handle of the knife.

U.S. Pat. No. 3,389,412 and U.S. Pat. No. 2,470,492 both describe a knife, fork, spoon and tin opener assembly in which the tin opener has a hollow handle forming a container for holding the knife, fork and spoon.

U.S. Pat. No. 4,317,284 describes an assembly of a knife, fork and spoon whose handles are magnetic; the assembly is held together by magnetic attraction.

U.S. Pat. No. 4,524,512 describes a knife, fork and spoon assembly in which the handles can be stacked and the handles have catches for keeping the knife, fork and spoon in a stacked condition.

U.S. Pat. No. 32,916 describes an assembly of a knife and a utensil having a spoon at one end and a fork formed at a second end. The handles of the two utensils have flanges that hold the assembly together.

U.S. Pat. No. 2,439,882 describes a container attached to the handle of a knife; the container holds a fork and spoon.

U.S. Design 347,975 and U.S. Pat. No. 4,377,035 each describes a container that can be fitted over the heads of a knife, fork and spoon to hold them together.

U.S. Pat. No. 1,053,387 describes a knife, fork and spoon assembly; flanges are provided on opposed sides of the handle of the knife for holding the spoon and fork.

U.S. Designs 284,442 and 362,160 each describes a knife, fork and spoon assembly; ribs are provided on opposed sides of the handle of the knife and on one side of the handles of the spoon and fork. The ribs of the spoon and fork are sized to fit tightly into the gaps between the ribs of the knife to hold the assembly together U.S. Pat. No. 5,845,403 describes an assembly of a first utensil having a spoon formed at one end and a fork formed at the other end and a second utensil having a spoon formed at one end and a knife formed at the other end. The handles of the two implements can be clipped together.

U.S. Design 318 600 describes a knife, fork and spoon assembly in which the handles are held in a stack by a pin passing through a hole in the handles of the implements.

U.S. Pat. No. 34,098 describes a metallic knife, fork and spoon assembly in which the knife handle is hollow and includes a pocket for holding a fork and spoon.

An object of the present invention is to provide a cutlery set assembly which overcomes at least some of the problems of the prior art. A further object of the invention is to provide a lightweight compact disposable cutlery set assembly where the spoon, fork and knife are of a design that can make them strong.

DISCLOSURE OF THE INVENTION

According to the present invention, there is provided a cutlery set assembly comprising at least a first and a second item of cutlery made of resilient plastics material, wherein each item of cutlery has a cylindrical handle and wherein the handles are shaped such that they can be nested with each other and wherein, when in such a nested condition, the handle of a first, outer, item extends more than half way around the handle of a second, inner, item to hold the items in the nested condition.

The assembly preferably includes a knife, fork and/or spoon.

The spoon, fork and knife are typically made from a resilient plastic material, for example, polypropylene. The cylindrical form of the handle portion provides strength and rigidity to the utensils during use and are comfortable to hold. In one embodiment, the neck of the spoon, fork and knife, i.e. where the handle meets the head of the fork and the bowl of the spoon, has a part cylindrical shape so that, compared to a neck having a flat cross section, the neck is stronger. As such, the cutlery may be used with foods which are relatively tough, for example, steak or frozen ice-cream.

The handles of the spoon, fork and knife will generally be hollow, although the innermost item in the nested arrangement may be solid. The handles are preferably rounded and may have circular or part circular cross sections although other cross-sections may be used, for example, rectangular.

The knife handle may be hollow and have a rib forming an extension of the blade extending along the inside of the hollow handle. Preferably, the rib runs along at least part of the length of the handle of the knife; the rib adds further strength to the knife to resist bending of the knife during use.

A slit may be provided running along the length of the hollow handles. Such slits in a spoon and/or fork may accommodate the rib of the knife (when provided) when the handle of the knife is nested with the handle of the spoon and/or fork.

The slits help the assembly of the cutlery set by allowing the walls of the handle portions to flex outwards when the handles are being nested together. The cavities within the hollow handles are such that the internal surface of the handle of an outer implement contacts the internal surface of the handle of an inner implement. The resilience of the plastic material preferably urges the handle of an outer implement against the handle of an inner implement and so holds the handles in firm engagement, thus keeping the cutlery set assembled together. The contacting surfaces may also be textured to further resist slippage of the handle portions when nested together.

Preferably, a spoon and a fork are adjacent; the respective diameters of the handles of the spoon and fork are in that case such as to allow the handle of one to be slidably inserted into the handle of the other. Preferably, the handle of the fork is inserted into the handle of the spoon. In this way the smooth curved surface area of the head of the spoon forms an exterior surface of the cutlery set assembly which both protects the user from the blade of the knife and the prongs of the fork (if present) and provides a more attractive appearance to the cutlery set when assembled.

When the handles of the spoon and fork are nested together, the slit of the spoon handle may lie in register with the slit of the fork handle to receive the knife. The diameter of the handle of the knife is preferably such as to allow the nested spoon and fork handles to be slidably inserted into the handle of the knife. The slits of the spoon and fork handles accommodate the blade and the rib of the knife and also guide the sliding motion of the spoon and fork handles into the handle of the knife.

Preferably, the handle of the fork is sandwiched between the handles of the spoon and the knife.

The nested assembly can be formed by sliding each item of cutlery lengthwise into or onto another item of the assembly. Alternatively, the assembly can be nested together by lining an item of cutlery (the inner item) with the slit in the item that fits outside it in the nested assembly (the outer item) and pushing the inner item against the slit. The pushing of the rounded handle of the inner item opens up the slit in the outer item until it reaches a width corresponding to the diameter of the handle of the inner item, whereupon the inner item will snap into the outer item and the resilience of the outer item will retain the inner item within it, thereby nesting the inner and outer items.

When the knife has a rib, the assembly of the nested cutlery assembly may be completed by inserting the rib of the knife into the slits of the spoon and/or fork handles by pressing the handle portion of the knife against the handle portion of the spoon. Continuing to press the handle of the knife against the handle of the spoon extends the flexible wall of the knife handle outwardly about the spoon/fork handle until the wall of the knife handle snap fits about the handle of the spoon/fork.

When the utensils are assembled as a unit, the handles of the knife and the handles of the spoon and/or fork share a common longitudinal axis.

The spoon and fork may have a curved neck portion joining the handle to the head of the spoon and fork respectively to add strength and rigidity to the neck of the spoon and fork.

The head of the spoon and fork may be thicker in cross-section than the handle portions to further resist bending of the head portions in use.

BRIEF DESCRIPTION OF THE DRAWINGS

The invention will be more clearly understood by way of description of an embodiment thereof given by way of example only with reference to the accompanying drawings, in which.

BEST MODE FOR CARRYING OUT THE INVENTION

Figure 1:
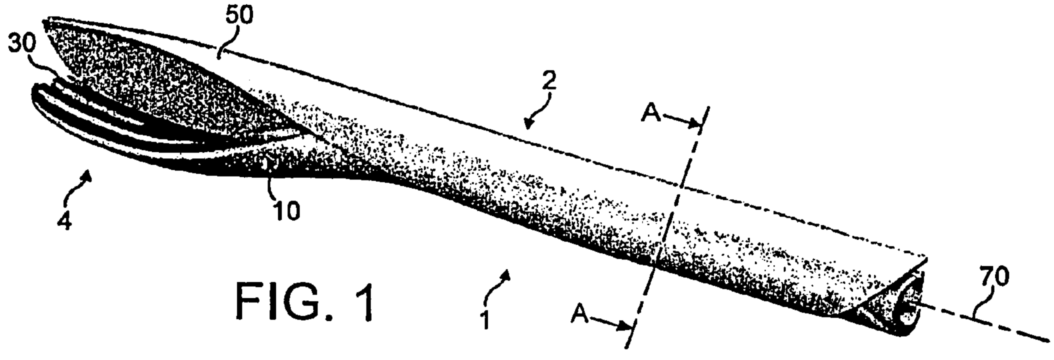
FIG. 1 is a perspective view of the cutlery set assembly according to the present invention showing the handles of the spoon, fork and knife assembled in a nested arrangement.
Figure 2:
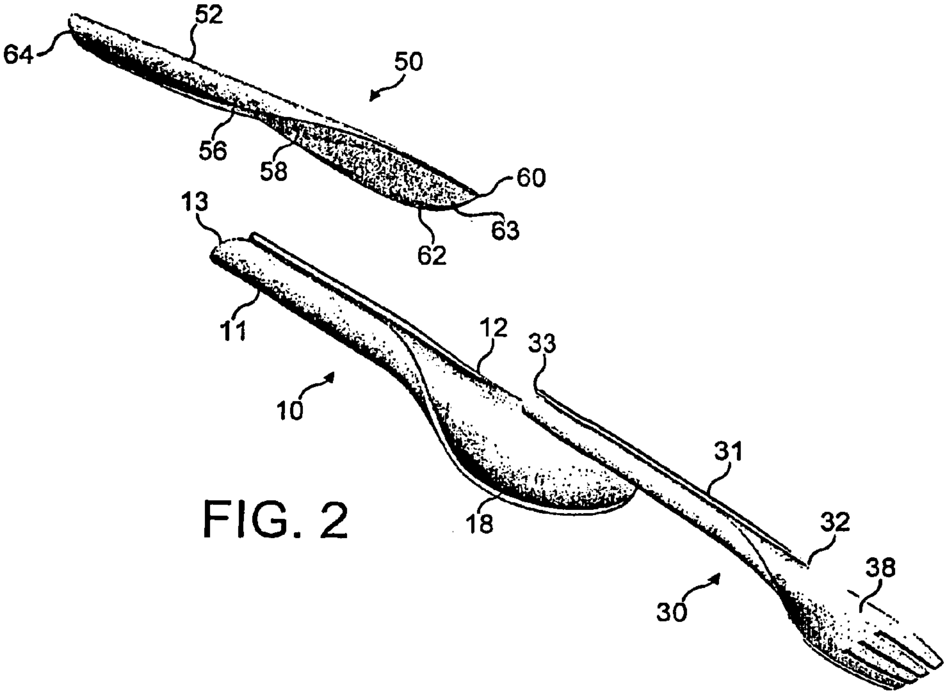
FIG. 2 is an exploded perspective view of the cutlery set assembly of FIG. 1.

Referring to the drawings and initially to FIGS. 1 to 4, there is shown a cutlery set assembly generally indicated by the reference numeral 1 comprising a spoon 10, fork 30 and knife 50 nested together as a single unit. The cutlery set assembly 1 has a cylindrical handle 2 and a head portion 4 which includes a head of the spoon 10, fork 30 and the knife 50. The spoon 10, fork 30 and knife 50 are made from polypropylene and formed by injection moulding.

Referring now to FIGS. 2 and 5 to 16 the spoon 10, fork 30 and knife 50 will now be described in turn so that it will be more clearly understood how they nest together to form the single unit of the cutlery set assembly 1.

As can be seen from FIGS. 2 and 5 to 7, the spoon 10 comprises a hollow cylindrical handle 11 having a leading end 12, a trailing end 13, and a central longitudinal axis 14. The spoon handle 11 has a slit 16 running along the entire length thereof and parallel to the longitudinal axis 14. The slit 16 flares outwardly from the spoon central axis 14 at the leading end 12 of the spoon handle 11 and slopes towards a spoon shaped head 18. The trailing end 13 of the spoon handle 11 is slanted.

The fork 30 (see FIGS. 2 and 8 to 11) is similar in shape to the spoon 10 and comprises a hollow cylindrical handle 31 having a leading end 32, a trailing end 33, and a central longitudinal axis 34. The fork handle 32 also has a slit 36 running along the entire length thereof and parallel to the fork central axis 34. The slit 36 flares outwardly from the fork axis

34 at the leading end 32 of the fork handle 31 and slopes towards a forked shaped head 38. The trailing end 33 is generally perpendicular to the fork axis 34.

Referring now to FIGS. 2 and 12 to 16, the knife 50 comprises a hollow substantially cylindrical handle 52 having a central longitudinal axis 54. The knife 50 has a slit 56 running along the entire length of the handle 52 and parallel to the central axis 54. A rib 58 (shown by broken line in FIG. 13) extends centrally along the length of the knife handle 52 on an inner curved surface thereof. The knife handle 52 tapers to a leading end 60 to expose a sharp knife edge 62 of a blade 63. A trailing end 64 of the knife handle 52 is slanted. The inclusion of the rib 58 within the handle gives greater strength and rigidity to the blade 63.

The cylindrical handles of the knife, fork and spoon results in greater comfort when using them than the usual design of a flat handle.

Figure 3:
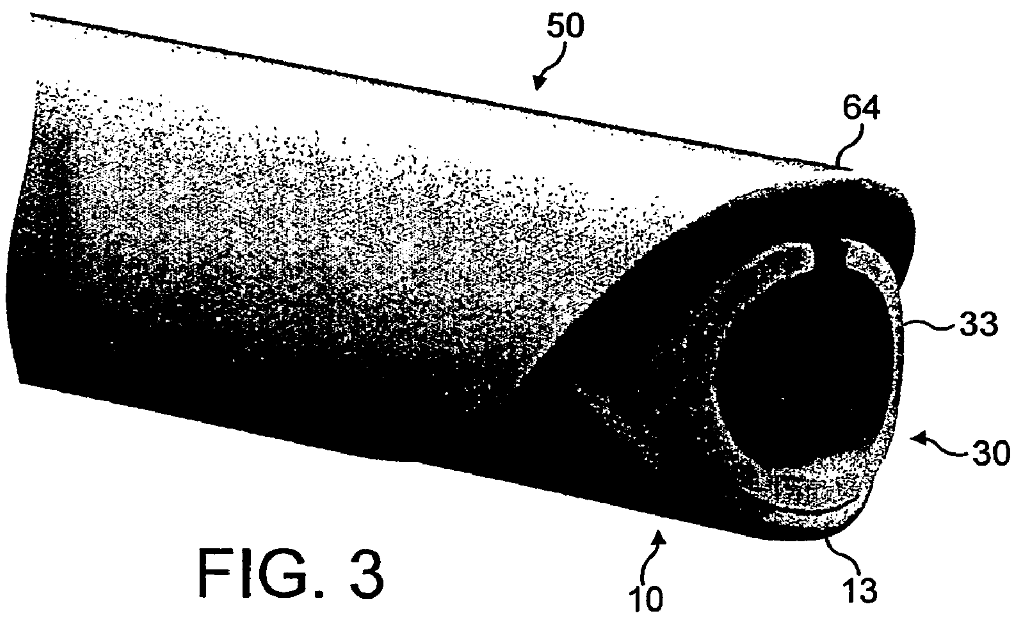
FIG. 3 is a perspective view of one end of the cutlery set assembly of FIG. 1 showing the nested arrangement of the handles of the spoon, fork and knife.

The diameters of the spoon and fork handles 11, 31 are such as to allow the fork handle 31 to be slidably inserted into the leading end 12 of the spoon handle 11, although the spoon handle will generally flex to accommodate the fork handle. When the fork handle 31 has been fully inserted into the spoon handle 11, the convex side of the forked head 38 lies adjacent the concave side of the spoon head 18, and the slit 16 of the spoon lies in register the slit 36 of the fork. The trailing end 33 of the fork handle 31 extends to the slanted trailing end 13 of the spoon handle 11. As shown in FIG. 3, the slanted nature of the trailing end 13 of the spoon handle allows a user to push the fork handle in an axial direction relative to the spoon to help disassemble the fork and spoon (see below). The inner curved surface of the spoon handle 11 engages with the outer curved surface of the fork handle 31 and the resilient nature of the polypropylene holds the spoon and fork handle portions 11, 31 in firm engagement with each other.

Figure 4:
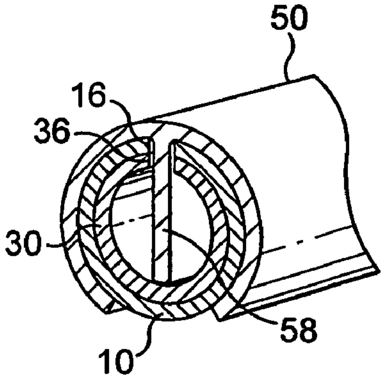
FIG. 4 is a perspective view of a section of the handles of the cutlery set assembly of FIG. 1 taken along the lines A-A.
Figure 5:
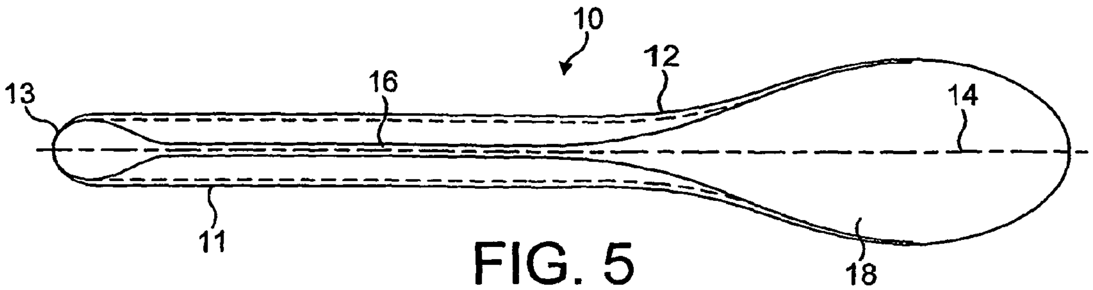
FIGS. 5, 6, 7*a* and 7*b* are respectively a plan view, side view, perspective view and an end view of a spoon of the cutlery set assembly of FIG. 1.
Figure 6:
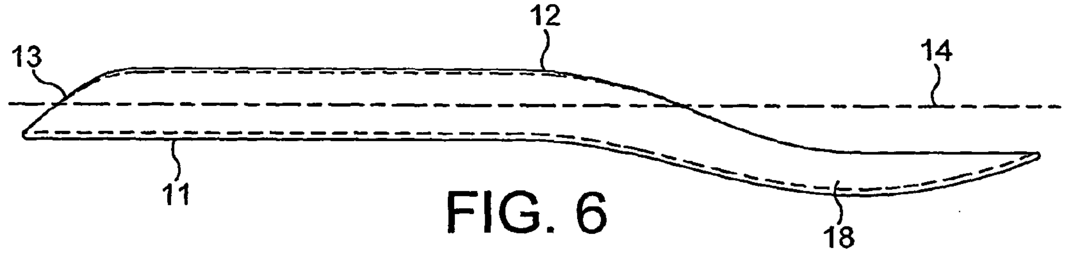
Figure 7A:
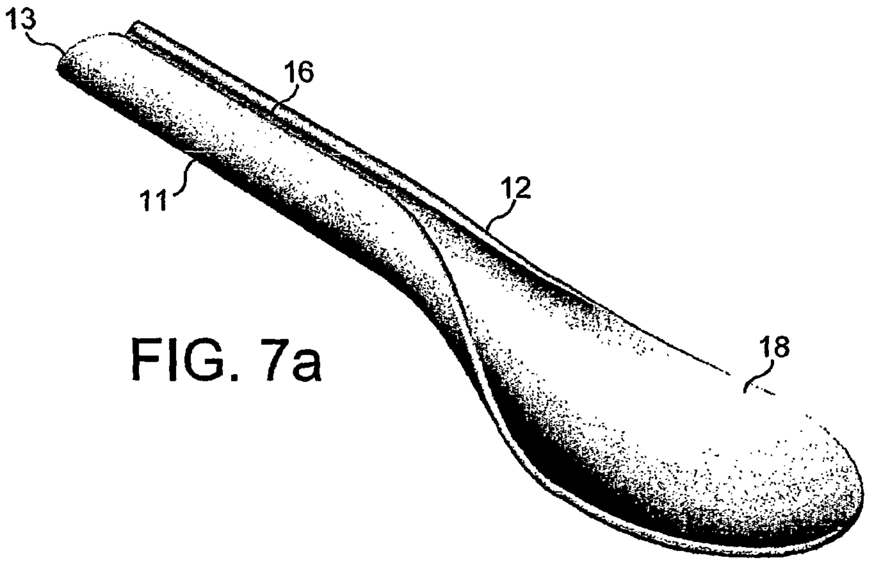
Figure 7B:
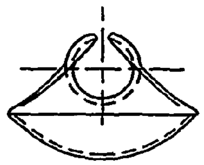
Figure 8:
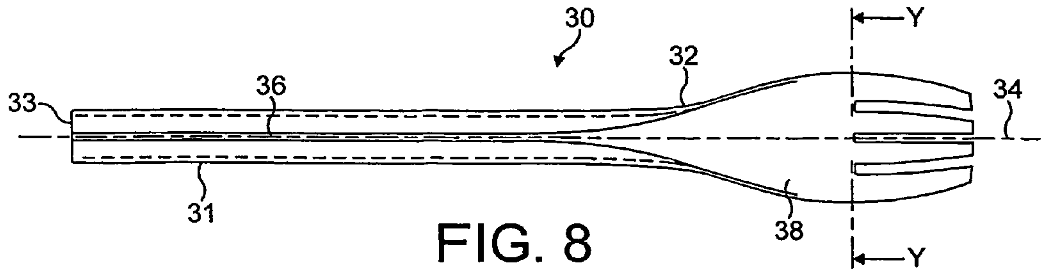
FIGS. 8, 9, 10 and 11 are respectively a plan view, side view, perspective view and sectional view (through line Y-Y of FIG. 8) of a fork of the cutlery set assembly of FIG. 1.
Figure 9:
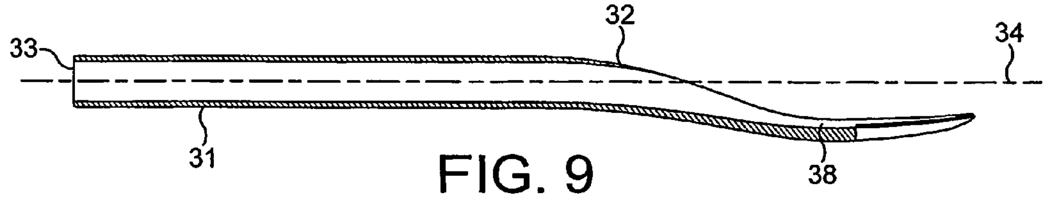
Figure 10:
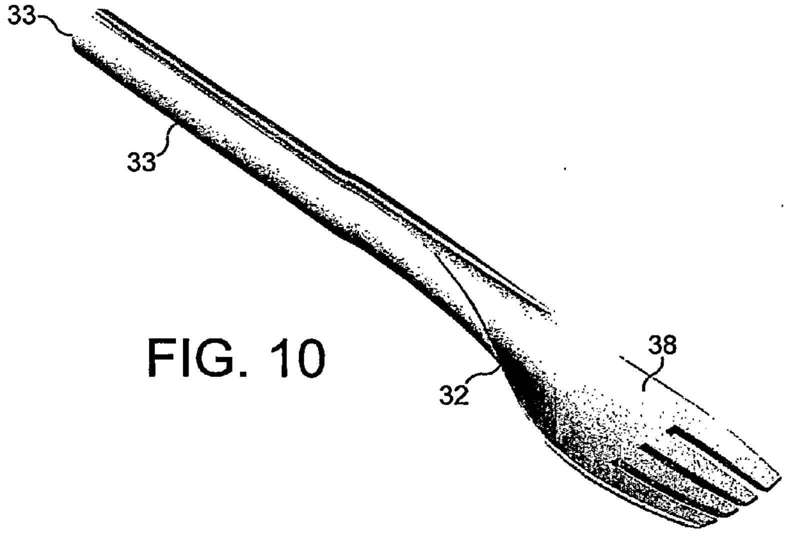
Figure 11:
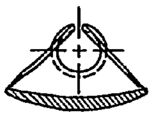
Figure 12:
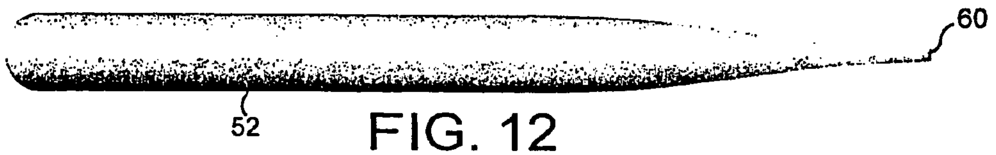
FIGS. 12 to 15 are respectively a plan view, side view, bottom view and perspective view of a knife of the cutlery set assembly of FIG. 1.
Figure 13:
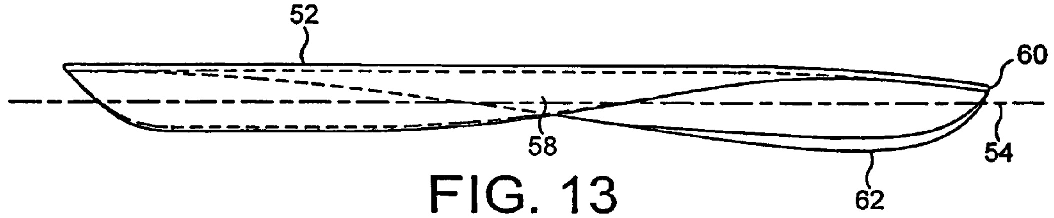
Figure 14:
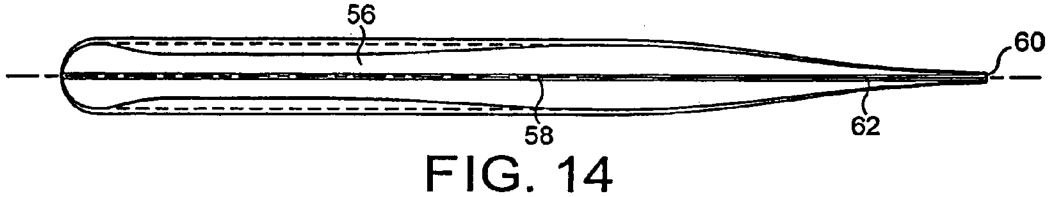
Figure 15:
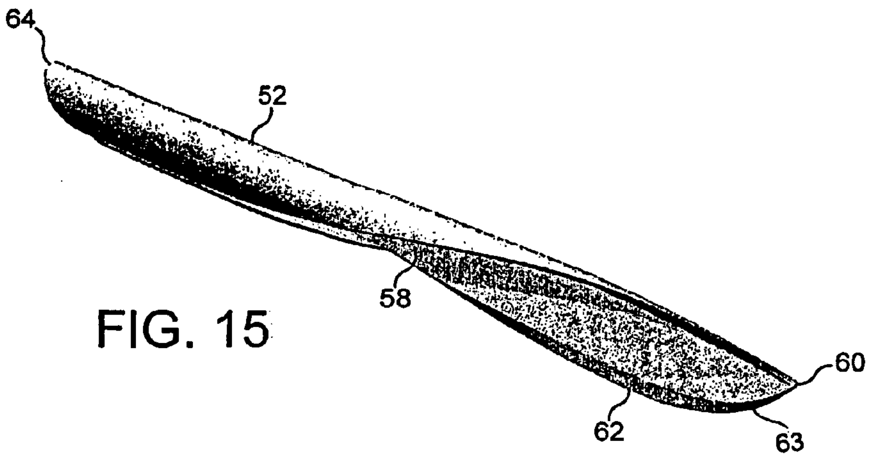
Figure 16:
FIG. 16 is an end view of the knife of FIG. 13 viewed from the front of the knife.
Figure 17:
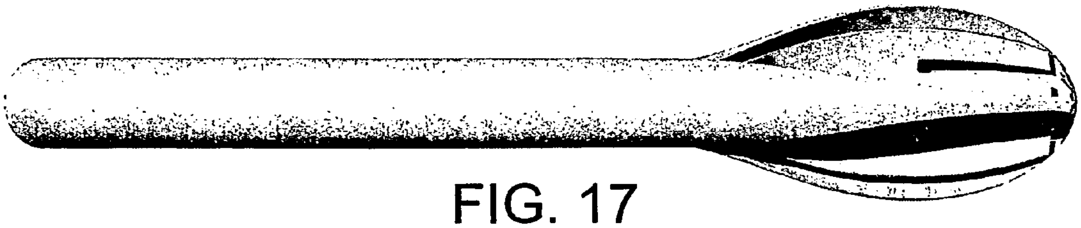
FIGS. 17 to 20 are respectively a plan view, side view, bottom view and end view of the cutlery set assembly of FIG. 1.
Figure 18:
Figure 19:
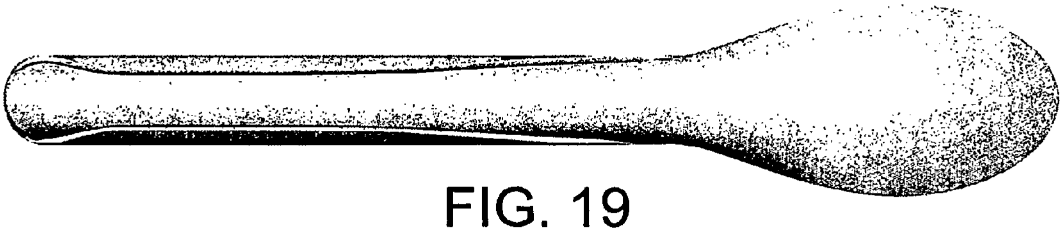
Figure 20:

To complete the assembly of the cutlery set, the slits 16 and 36 of the spoon 10 and fork 30 receive the rib 58 of the knife 50 (see FIG. 4). The diameter of the knife handle 52 is such as to allow the trailing ends 13, 33 of the nested spoon and fork handles 11, 31 to be slidably inserted into the leading end 60 of the knife handle 52, although the knife handle will flex outwardly to accommodate the spoon/fork. The aligned slits 16 and 36 of the spoon and fork handles 11 and 31, and the knife rib 58 act like a rail to guide the sliding motion of the spoon and fork handles 11, 31 into the knife handle 52 so that the spoon handle 11 is sandwiched between the fork and knife handles 31, 52. The outer curved surface of the spoon handle 11 engages with the inner curved surface of the knife handle 52 and the resilient nature of the polypropylene holds the spoon and knife handles 11, 52 in firm engagement with each other when nested together.

Alternatively, the assembly of the cutlery set assembly may be completed by inserting the knife rib 58 into the slits 16, 36 by pressing the knife handle 52 against the spoon handle 11. Continuing to press the handle 52 of the knife against the handle 11 of the spoon distorts the flexible wall of the knife handle 52 and increases the width of the slit 56 until the width of the slit 56 is the same as the diameter of the knife handle 52, whereupon the knife handle 52 snap fits over the spoon handle 11.

When the spoon 10, fork 30 and knife 50 are assembled as a unit, their handles 11, 31 and 52 share a common longitudinal axis 70.

Figure 21:
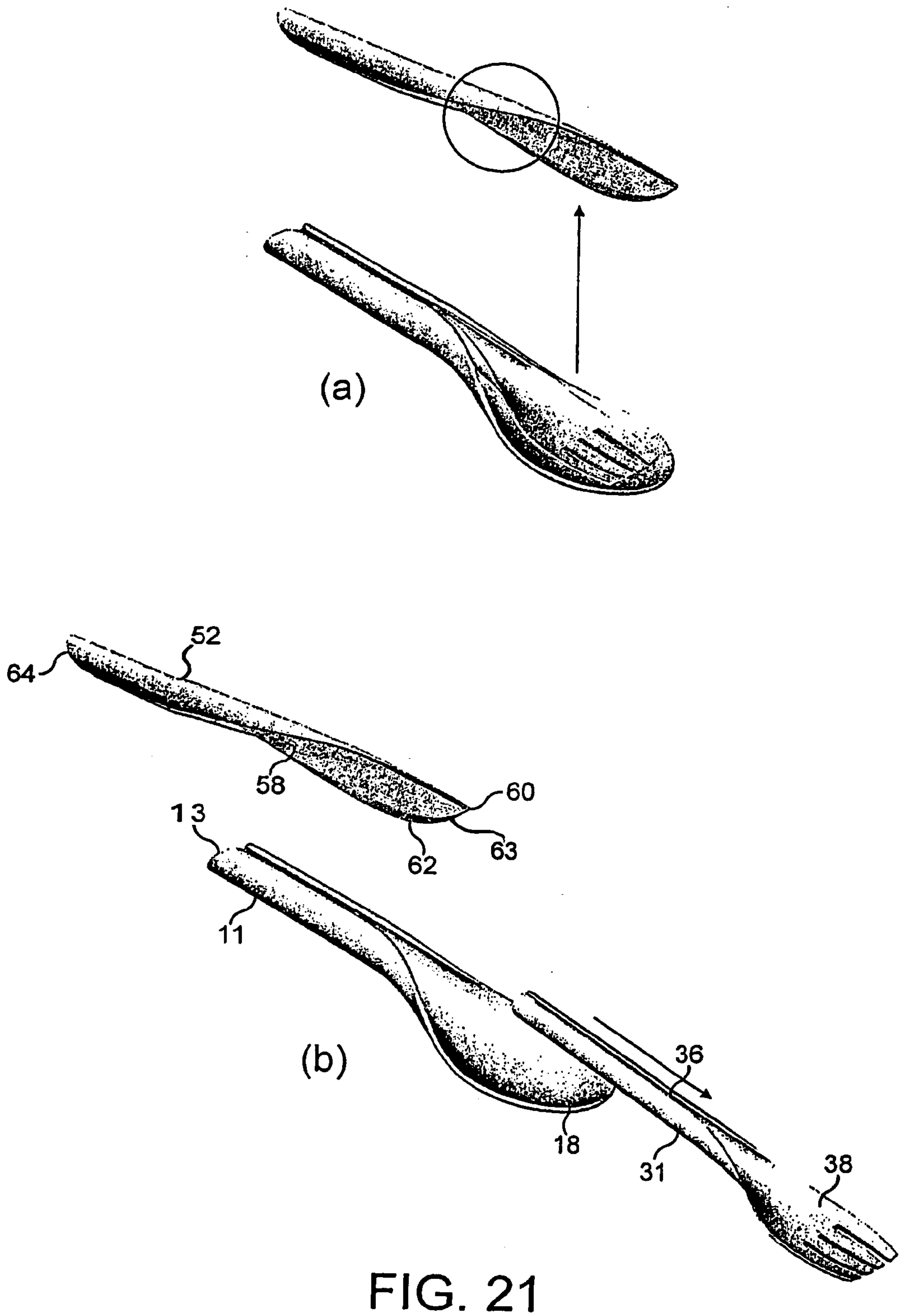
FIG. 21 is a perspective view showing how to disassembly the cutlery set assembly.

To disassemble the cutlery set assembly 1 (see FIG. 21), the assembly process is simply reversed. The knife 50 is removed from about the spoon handle 11 by sliding the knife 50 in a direction away from the spoon head 18. Alternatively, the knife 50 can be gripped at the leading end 60 and lifted in a levered action about the trailing end 13 of the spoon 10, the applied lifting force expanding the resilient wall of the knife handle 52 and increasing the width of the knife slit 56 until the knife 52 can be removed from the spoon handle 11.

Because the trailing end 13 of the spoon 10 is slanted (see FIG. 3), the trailing end 33 of the of the fork 30 is accessible and can be pushed in the direction of the spoon head 18 to partially slide the fork handle 31 out of the spoon handle 11. By gripping the fork head 38 and pulling the fork 30 in the direction of the spoon head 18, the fork handle 31 is completely removed from the spoon handle 11.

The slit 16 in the spoon handle 11 is preferably 1.5-5 mm wide as measured across the surface of the handle, preferably 1.9-3 mm wide. The slit 36 along the fork handle 31 is preferably of a similar dimension to that of the slit along the spoon handle and preferably not wider than the slit along the spoon handle. The width of each of the slits is preferably substantially uniform along the length of the handle. The knife rib 58 is of a width that allows it to fit and slide easily into the slits provided in the spoon and fork handles.

Each of the handles preferably has a substantially uniform cross-section throughout its length, as depicted in the Figures.

The nesting arrangement of the cutlery assembly 1 provides an easy and efficient way of assembling/disassembling the spoon, fork and knife so that it can be transported as a single unit.

The tubular form of the handle portions 11, 31, 52 provide strength and rigidity so as to allow the spoon 10, fork 30 and knife 50 to deal with relatively tough foods, for example, steak and frozen ice-cream.

The forked head 38 and spoon head 18 may be thicker in cross-section than the cross-section of the handles 11, 31 to impart further strength to the forked head 38 and spoon head 18. The knife rib 58 also adds further strength to the knife 50 to resist bending during use.

The invention is not limited by the embodiments hereinbefore described which may be varied in both construction and detail within the scope of the appended claims.

The invention claimed is:

1. A cutlery set assembly comprising at least a first and a second item of cutlery made of resilient plastics material, one of said items of cutlery being a knife having a blade, wherein each item of cutlery has a cylindrical handle and a head, and wherein the handles are shaped such that they can be nested with each other and wherein, when in such a nested condition, the heads of the items are adjacent one another at a same end of the assembly and the handle of the first item extends outside of and more than half way around the handle of the second item, thereby grasping the handle of the second item, whereby the items are held together in firm engagement in the nested condition.

2. A cutlery set assembly as claimed in claim 1, further comprising a third item of cutlery and wherein, when in the nested condition, the handle of the second item extends outside of and more than half way around the handle of the third item thereby grasping the handle of the third item, whereby the second and third items are held together in the nested condition.

3. A cutlery set assembly as claimed in claim 1, wherein the handles of at least two of the items of cutlery are hollow.

4. A cutlery set assembly as claimed in claim 1, wherein at least one of the items of cutlery has a slit running along the length of the handle of said at least one item.

5. A cutlery set assembly as claimed in claim 4, wherein the knife has a rib forming an extension of the blade and being joined to, and extending along, an inside of a hollow handle of the knife.

6. A cutlery set assembly as claimed in claim 1, wherein the knife has a rib forming an extension of the blade that extends along an inside of a hollow handle of the knife.

7. A cutlery set assembly as claimed in claim 1, wherein the handle of the knife tapers towards an end of the blade of the knife to expose a sharp edge of the blade.

8. A cutlery set assembly as claimed in claim 1, wherein part of the handle of the knife extends over at least part of the blade of the knife.

9. A cutlery set assembly as claimed in claim 1, wherein each item has a neck between the handle and the rest of the item, said neck being part cylindrical in cross-section.

10. A cutlery set assembly as claimed in claim 1, wherein surfaces of adjacent handles engage when nested, a resilience of walls of the handles keeping the cutlery set assembly together.

11. A cutlery set assembly as claimed in claim 10, wherein engaging surfaces of the handles are textured to further resist slippage of the handles when nested.

12. A cutlery set assembly as claimed in claim 1, wherein a diameter of an outside of the handle of the second item is greater than an internal diameter of a hollow handle of the first item when the handles are in an unnested condition.

13. A cutlery set assembly as claimed in claim 1, wherein the items of the assembly include a knife, fork and spoon.

14. A cutlery set assembly as claimed in claim 1, wherein the resilient plastics material is polypropylene.

15. A cutlery set assembly as claimed in claim 1, wherein the items of cutlery are formed by injection moulding.

16. A cutlery set assembly as claimed in claim 1, wherein the handle of each item of cutlery nests or is nested by the handle of another item of cutlery of the set.

17. A cutlery set assembly as claimed in claim 1, wherein the handles of the items are coaxial when nested.

18. A cutlery set assembly comprising a first, a second and a third item of cutlery made of resilient plastics material, wherein each item of cutlery has a cylindrical handle and wherein the handles are shaped such that they can be nested with each other and wherein, when in the nested condition, the handle of the first item extends outside of and more than half way around the handle of the second item thereby grasping the handle of the second item, whereby the first and second items are held together in the nested condition, and the handle of the second item extends outside of and more than half way around the handle of the third item thereby grasping the handle of the third item, whereby the second and third items are held together in firm engagement in the nested condition.

19. A cutlery set assembly as claimed in claim 18, wherein the first item is a knife having a blade and the second and third items each have a slit running along the length of their handles and wherein the blade of the knife is located in the slits of the second and third items when the items of the cutlery are in the nested condition.

20. A cutlery set assembly comprising a spoon, a fork and a knife having a blade as items of cutlery and each made of resilient plastics material wherein each item of cutlery has a cylindrical handle, wherein the handles are shaped such that they can be nested with each other and wherein, when in such a nested condition, the handle of one of the items extends outside of and more than half way around the handles of the other items thereby grasping the handle of one of the other items, whereby the items are held together in the nested condition, wherein the knife has a rib forming an extension of the blade that extends along an inside of a hollow handle of the knife and wherein the handles of the spoon and fork each have a slit running along the length of its handle and the slit of the spoon handle lies in register with the slit of the fork handle when the handles thereof are nested with each other so that the slits receive the rib of the knife, the handles of the fork and spoon being nested within the handle of the knife.

21. The cutlery set assembly as claimed in claim 20, wherein a head of at least one of the spoon and the fork has a thicker cross-section than a cross-section of its corresponding spoon handle and fork handle.

22. A cutlery set assembly comprising a first, a second and a third item of cutlery made of resilient plastics material, wherein each item of cutlery has a cylindrical handle and wherein the handles are shaped such that they can be nested with each other and wherein, when in the nested condition, the handle of the first item extends outside of and more than half way around the handle of the second item thereby grasping the handle of the second item, whereby the first and second items are held together in the nested condition, and the handle of the second item extends outside of and more than half way around the handle of the third item thereby grasping the handle of the third item, whereby the second and third items are held together in the nested condition, wherein the first item is a knife having a blade and the second and third items each have a slit running along the length of their handles and wherein the blade of the knife is located in the slits of the second and third items when the items of the cutlery are in the nested condition, and wherein the blade of the knife includes a rib joined to and extending along an inside of the handle of the knife, and the rib is located in the slits of the second and third items when the items of cutlery are in a nested condition.

23. A cutlery set assembly comprising at least a first and a second item of cutlery made of resilient plastics material, one of said items of cutlery being a knife having a blade, wherein each item of cutlery has a cylindrical handle and a head, at least the knife handle being hollow, and wherein the handles are shaped such that they can be nested with each other and wherein, when in such a nested condition, the heads of the items are adjacent one another at a same end of the assembly and the handle of the first item extends outside of and more than half way around the handle of the second item, thereby grasping the handle of the second item, whereby the items are held together in the nested condition, wherein at least the second item of cutlery has a slit running along the length of its handle, wherein the knife has a rib forming an extension of the blade and being joined to, and extending along, an inside of the hollow handle of the knife, and wherein in the nested condition, the rib of the knife is located in the slit extending along the handle of at least the second item of cutlery.

* * * * *